United States Patent [19]
Russell
[11] 3,925,103
[45] Dec. 9, 1975

[54] RADIATION HARD SOLAR CELL AND ARRAY

[75] Inventor: Robert L. Russell, Tustin, Calif.
[73] Assignee: TRW Inc., Redondo Beach, Calif.

[22] Filed: Oct. 27, 1972
[21] Appl. No.: 301,453

[52] U.S. Cl. .................. 136/202; 136/89; 136/201; 136/206; 136/224; 310/3 R; 310/3 B
[51] Int. Cl. .......................... H01v 1/12; H01l 15/02
[58] Field of Search ............. 136/201, 202, 206, 89, 136/224; 310/3 R, 3 B

[56] References Cited

UNITED STATES PATENTS

| | | | |
|---|---|---|---|
| 2,847,585 | 8/1958 | Christian | 310/3 B |
| 3,597,281 | 8/1971 | Webb | 136/206 |
| 3,620,847 | 11/1971 | Wise | 136/89 |
| 3,672,999 | 6/1972 | Barbera | 136/89 |
| 3,737,689 | 6/1973 | Schuerholz | 310/3 R |

OTHER PUBLICATIONS

Electronic Industries, 19 (No. 1), p. 77 (1960).
Wolff, Electronics, Nov. 27, 1959, p. 55–57 (1959).

*Primary Examiner*—Benjamin R. Padgett
*Assistant Examiner*—E. A. Miller
*Attorney, Agent, or Firm*—Daniel T. Anderson; Donald R. Nyhagen; Jerry A. Dinardo

[57] ABSTRACT

A power generating solar cell for a spacecraft solar array is hardened against transient response to nuclear radiation while permitting normal operation of the cell is a solar radiation environment by shunting the cell with a second solar cell whose contacts are reversed relative to the power cell to form a cell module, exposing the power cell only to the solar radiation in a solar radiation environment to produce an electrical output at the module terminals, and exposing both cells to the nuclear radiation in a nuclear radiation environment so that the radiation induced currents generated by the cells suppress one another.

13 Claims, 11 Drawing Figures

RADIATION HARD SOLAR CELL AND ARRAY

BACKGROUND OF THE INVENTION

Field of the Invention: This invention relates generally to the field of solar power generation and more particularly to a method of and means for hardening a solar array against detrimental response to nuclear radiation produced by nuclear weapon detonation.

Prior Art: Solar cells of the kind utilized in spacecraft solar arrays achieve reasonably high efficiency by having a relatively large p-n junction area and long carrier lifetime. Unfortunately, while these factors are beneficial from the standpoint of solar power generation, they also provide the solar cells with extremely high response to nuclear radiation. As a consequence, conventional solar array powered spacecraft systems are subject to severe damage or catastrophic failure in the event of a nuclear weapon detonation in the vicinity of the spacecraft due to the generation of extreme current and voltage transients in the solar array even though the detonation is too distant from the spacecraft to cause any significant structural damage. The normal short circuit current in a solar array, for example, is on the order of 50 to 100 ma, whereas the transient radiation pulse produced by a nuclear weapon detonation may create a short circuit peak current on the order of several tens of amperes. The radiation induced open circuit voltage also rises to a level substantially above the normal open circuit voltage. In addition, there is an inherent storage time associated with the conventional solar cells during which the current and voltage remain essentially constant at their peak levels. This storage time is a function of radiation intensity and may be on the order of tens to hundreds of microseconds. These high level current and voltage transients will overcome most if not all conventional filtering techniques and cause semiconductor burnout and final complete system failure.

A radiation hard solar array is one which has substantially normal response to solar radiation but whose response to nuclear radiation is suppressed to a safe level such that neither the array, nor the spacecraft systems powered by the array will suffer significant damage or failure, at least permanent failure, in the event of exposure to a nuclear radiation environment. A large p-n junction area and long carrier lifetime, while providing a solar cell with reasonable efficiency in its normal function of converting solar energy to electrical energy, also provides the cell with high response to nuclear radiation. As a consequence, the concept of a radiation hard solar cell involves conflicting requirements and a trade-off between efficiency and radiation hardness. Since the efficiency of a conventional solar cell is only about 11%, this trade-off is not very attractive.

At the present time, there is very little prior art relating to radiation hard solar cells. The studies and work that have been done have concentrated on achieving radiation hardness by reducing the carrier lifetime of a solar cell. While these efforts have resulted in some improvement in the area of permanent cell damage by nuclear irradiation, the improvements in the area of transient cell hardness have been extremely slight. Accordingly, there is a definite need for a radiation hard solar cell for use in spacecraft solar array applications involving a threat of damaging nuclear irradiation resulting from nuclear weapon detonation.

SUMMARY OF THE INVENTION

The present invention provides such a radiation hard solar cell, or more correctly a cell module, and a radiation hard solar array comprising the solar cell modules. The radiation hard solar cell module includes a primary power generating solar cell, a shunt solar cell, and terminals for connecting the module to other similar modules to form a solar array. One terminal of the module is connected to the positive contact of the power cell and the negative contact of the shunt cell. The other module terminal is connected to the negative contact of the power cell and the positive contact of the shunt cell. Accordingly, the power and shunt cell contacts are reversed relative to one another so that concurrent exposure of the active cell faces to radiation produces current in one direction in the power cell leg and current in the opposite direction in the shunt cell leg. These currents thus tend to cancel one another.

The active face of the power cell is exposed to receive both solar radiation in a normal solar radiation environment and nuclear radiation in the event of exposure of the cell module to a nuclear radiation environment. The active face of the shunt cell, on the other hand, is shielded against exposure to solar radiation in the solar radiation environment but is exposed to receive nuclear radiation in the nuclear radiation environment.

Accordingly, in a normal solar radiation environment, only the power cell receives solar radiation, and the solar cell module generates an electrical output which is a function of the solar radiation energy incident in the active face of the power cell only. On the other hand, in a nuclear radiation environment, the active faces of both the power cell and the shunt cell receive nuclear radiation. Under these conditions, the current flow through the cells tend to cancel one another so that the output of the shunt cell effectively suppresses the output of the power cell. According to the present invention, the two cells of the module may be matched, i.e. have substantially equal response to nuclear radiation, so that in a nuclear radiation environment, the module produces substantially a zero output. Alternatively, the shunt cell may have greater response to nuclear radiation than the power cell so that in a nuclear radiation environment, the cell module produces a negative output, i.e., an output current opposite to that of the power cell in a normal solar radiation environment.

The shunt cell also provides a built-in shadow compensation shunt diode for the power cell, thereby eliminating the need for complex and costly cell shadowing studies when designating a spacecraft solar array composed of the present radiation cell modules.

The power and shunt cells of the present cell module form a closed loop circuit. Exposure to the cell module to transient nuclear radiation produces a transient current in one direction within this loop. According to a further feature of the invention, means such as capacitors or diodes may be connected in the module circuit loop to provide d-c isolation between the power and shunt cells while permitting radiation induced transient current flow in the loop. This feature permits use of the shunt cell also as a redundant power generating cell in the event of failure of the primary power cell by exposing the shunt cell to solar radiation.

DESCRIPTION OF THE PREFERRED EMBODIMENTS

Figures 1, 2, 3, 4, 5:
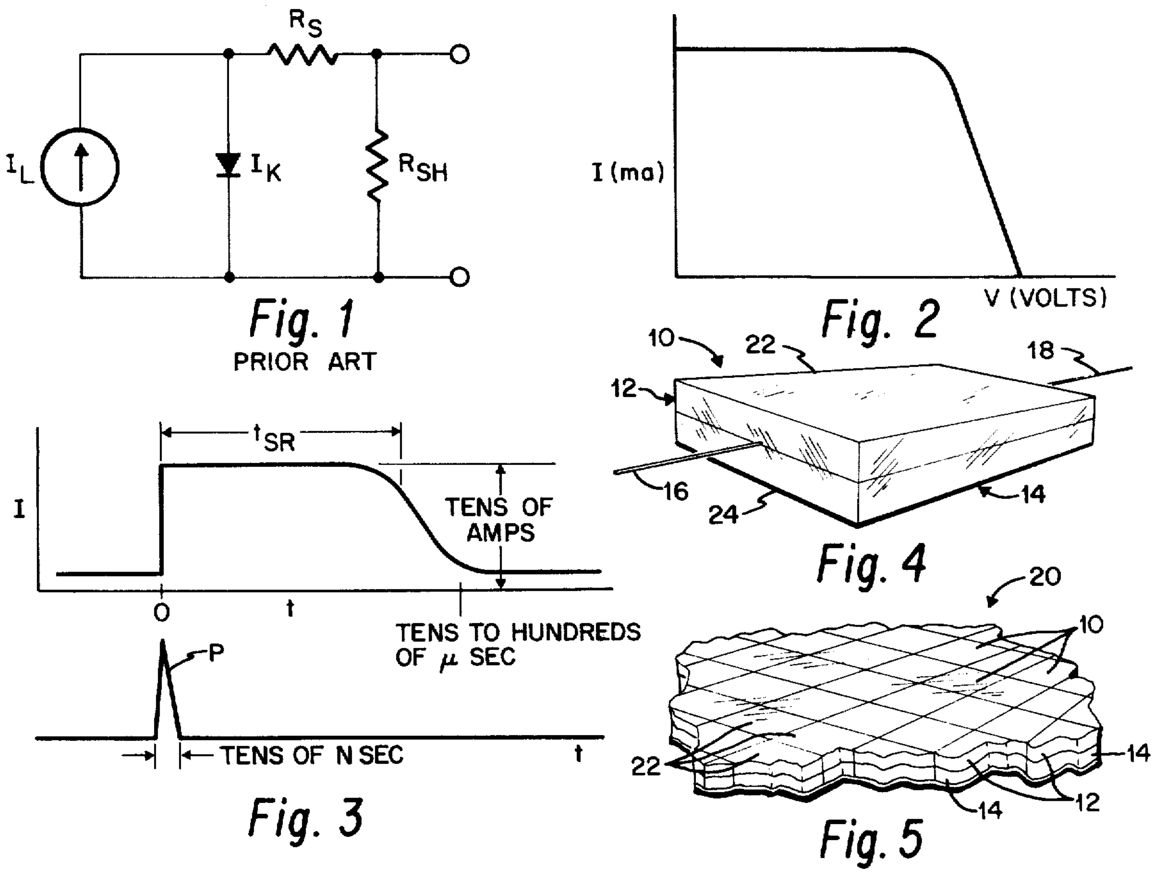
FIG. 1 illustrates the equivalent circuit of a conventional solar cell.
FIG. 2 depicts the normal I–V characteristics of the cell.
FIG. 3 depicts the cell response to transient nuclear radiation.
FIG. 4 illustrates a radiation hard solar cell module according to the invention.
FIG. 5 illustrates a solar array embodying the radiation hard cell module.

Reference is made first to FIGS. 1 and 2, illustrating the equivalent circuit and normal I–V characteristics of a conventional solar cell of the kind commonly employed in spacecraft solar arrays. The solar cell (FIG. 1) can be described as a light activated constant current generator $I_L$ in parallel with all ideal diode $I_K$, and both in series with a resistor $R_S$ and parallel with a resistor $R_{SH}$. In normal operation, resistances $R_S$ and $R_{SH}$ are negligible. The short circuit current of the cell is typically on the order of 50 to 100 ma and the open circuit cell voltage is about 0.55 v. A solar array is composed of a large number of solar cells, i.e. up to 100,000 cells in a 600 to 700 watt array, connected in appropriate series - parallel combinations.

FIG. 3 illustrates the time response of such a solar cell to a transient nuclear radiation pulse P. In this case, the cell current and voltage increase significantly as a function of the radiation intensity. Moreover, there is an inherent storage time ($t_{TS}$) associated with the cell which is also a function of radiation intensity. For radiation intensities of current interest, the short circuit current may be increased to several tens of amperes, the open circuit voltage may be increased to several tens of millivolts, and the storage time can range from tens to hundres to microseconds. This type of cell response, when applied to an entire solar array with its series and parallel cell combinations, will overcome most conventional filtering techniques and cause conductor burnout and final complete system failure.

Turning now to FIGS. 4 – 7, the radiation hard solar cell module 10 (FIG. 4) of the invention comprises a pair of conventional cells 12 and 14. Cell 12 is the primary solar power generating cell of the module. Cell 14 is a shunt cell arrayed in parallel with the power cell. Module 10 has terminals 16, 18 for connecting the module in circuit with other similar modules to form a solar array 20 (FIG. 5). Terminal 16 is connected to the positive contact of the power cell 12 and the negative contact of the shunt cell 14. Terminal 18 is connected to the negative contact of the power cell and the positive contact of the shunt cell.

Cells 12, 14 are arranged with the active face 22 of the power cell exposed to receive solar radiation in a normal solar radiation environment and nuclear radiation in a nuclear radiation environment produced by a nuclear weapon detonation. The active face 24 of the shunt cell 14, on the other hand, is shielded against receiving solar radiation in the solar radiation environment but is exposed to receive nuclear radiation in the nuclear radiation environment.

It will be immediately evident to those versed in the art that this selective shielding of the shunt cell may be accomplished in various ways. In the particular cell module 10 shown, the power and shunt cells 12, 14 are mounted back-to-back and the module is oriented so that the power cell faces the sun. Accordingly, the power cell receives solar radiation, while the shunt cell is in the shadow of the power cell and faces away from the sun so as to be shielded by the power cell from receiving solar radiation. The active face of the shunt cell, however, is exposed to receive nuclear radiation in a nuclear radiation environment. Similarly, in the solar array 20, the several cell modules 10 are assembled in such a way that their power cells 12 are located at one side of the array and their shunt cells 14 are located at the opposite side of the array, the array is oriented with its power cell side facing the sun and its shunt cell side facing away from the sun. Accordingly, the power cells receive solar radiation while the shunt cells are in the array shadow and hence shielded against receiving solar radiation. All of the array cells are exposed to receive nuclear radiation in a nuclear radiation environment.

Figure 6:
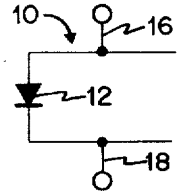
FIG. 6 illustrates the effective equivalent circuit of the module in a normal solar radiation environment.
Figure 7:
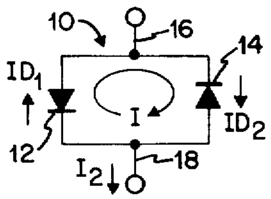
FIG. 7 illustrates the effective equivalent circuit of the module in a nuclear radiation environment.

In normal operation of the solar array 20 in a solar radiation environment, the shunt cell 14 of each solar cell module 10 presents essentially an open circuit and the module has the effective equivalent circuit represented in FIG. 6. Under such normal operating conditions, each module operates as a conventional solar cell and generates an electrical output which is a function of the solar radiation incident on the active face 22 of the power cell 12. The output of the solar array 20 is determined by the series-parallel arrangement of the several array modules.

Assume now that the solar array 20 is exposed to a nuclear radiation pulse from a nuclear weapon detonation. Under these conditions, both cells 12, 14 of array module 10 receive radiation, and the module functions with the equivalent circuit of FIG. 7. In this module circuit configuration, the cells are connected in parallel to form a closed loop circuit. The radiation incident on the power cell 12 produces a current $ID_1$ in the power cell leg of the circuit loop. The radiation incident on the shunt cell 14 produces a current $ID_2$ in the shunt cell leg of the loop. These currents flow in opposite directions and thus tend to cancel one another. In other words, the output of the shunt cell suppresses the output of the power cell, and the effect of the transient radiation pulse, as viewed from the module output terminals 16, 18 is reduced, eliminiated, or overcompensated, depending upon the relative responses of the cells to the nuclear radiation. The currents $ID_1$, $ID_2$ continue to produce a current $I_1$ within the closed module loop. This latter current circulates through the loop in the direction shown to dissipate the radiation reduced energy. The module generates an external output current $I_2$.

Figure 8:
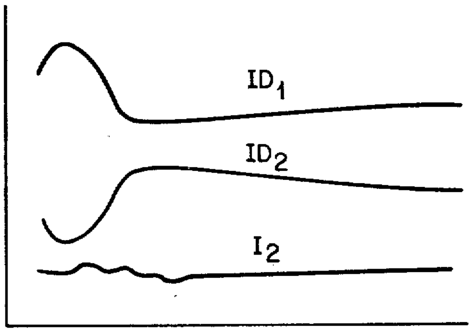
FIG. 8 depicts the internal and external radiation induced transient currents in a radiation hard cell module having cells with matched radiation response.
Figure 9:
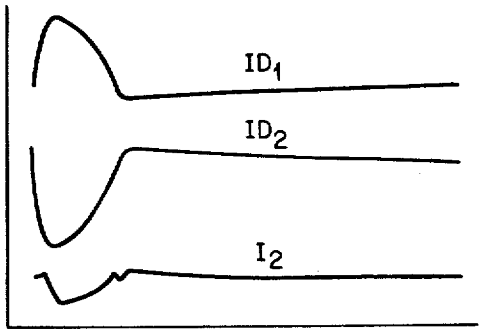
FIG. 9 depicts the radiation induced currents in a cell module with cells having mismatched radiation response.

Attention is now directed to FIGS. 8 and 9 illustrating the internal and external module currents for two different relative radiation responses of the power and shunt cells 12, 14. FIG. 8 illustrates the module currents when the two cells are matched to have substantially equal radiation responses. In this case, the internal cell currents, $ID_1$, $ID_2$ are substantially equal but opposite, and resultant module output current $I_2$ remains substantially zero. In other words, the module has a null output. FIG. 9 illustrates the currents when the cells are mismatched in such a way that the response of the shunt cell exceeds that of the power cell. In this case, the shunt cell current $ID_2$ exceeds the power cell current $ID_1$, and the module effectively exhibits a negative output; that is an output current $I_2$ opposite to that of the module in a normal solar radiation environment.

At this point, it is evident that the radiation hard solar cell module of the invention has several advantages over conventional solar cells. These advantages are negligible transient response to nuclear weapon detonation, reduction or elimination of the threat to solar array powered satellite systems caused by the transient effects of a nuclear weapon detonation, and reduction or elimination of the need for radiation protective filters, voltage limiters, and current limiters in the main bus lines.

An addiitional advantage of the module is elimination of expensive and time consuming studies to determine the shadowing effects of spacecraft protrusions on solar array output and elimination of the need for shunt shadow compensation diodes around individual cells or groups of cells. In this regard, it is well known that most spacecraft have protrusions, such as antennas, paddles, attitude controls and so on, which may cast shadows on the spacecraft solar arrays. If any cell in a series string of cells in a solar array is thus shadowed, the usefulness of the entire string is lost since the shadowed cell effectively opens the entire string. For this reason, satellite designers must perform complex and costly studies involving sun angle relative to the spacecraft as a function of time and orbital position to determine which solar array cells will be shadowed. Shunt diodes are then connected around the shadowed cells. When a shunted cell is shadowed, the shunt diode carries the current and the only loss is the shadowed cell. The present invention eliminates the need for these shadowing studies since each module 10 effectively has a self-contained shunt diode which is the shunt solar cell 14 of the module.

According to another feature of the invention, the present radiation hard module may be designed to permit utilization of the shunt cell as a redundant power generating cell in the event of transient or permanent damage to the main power cell by illuminating the shunt cell with solar radiation. The shunt cell may be illuminated in any convenient way, as by moving a reflector into a position to reflect solar radiation energy onto the active face of the cell.

Figure 10:
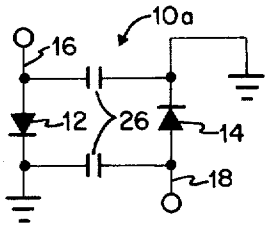
FIG. 10 and 11 illustrate modified radiation hard solar cell modules according to the invention whose shunt cells provide redundant power generating cells.
Figure 11:
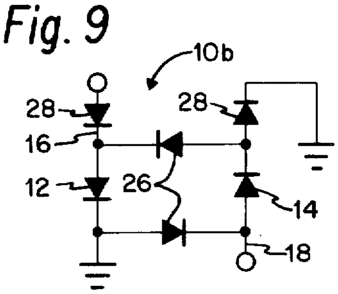

FIG. 10 and 11 illustrate modified radiation hard solar cell modules 10a, 10b according to the invention which have both transient hardness and permanent damage hardness. The terminals of these modified modules are connected to the power and shunt cell contacts in the same manner as described earlier except that d-c blocking elements 26 are interposed between the terminals and the shunt cell contacts. The negative contacts of the cells are grounded, and diodes 28 are placed in FIG. 11, as shown. Blocking elements 26, which are capacitors in FIG. 10 and diodes in FIG. 11, pass the internal radiation induced transient current within the closed circuit loops of the modules while providing d-c isolation between the module cells.

What is claimed as new in support of Letters Patent is:

1. A radiation hard solar cell module, comprising:

a pair of solar cells including a primary power generating cell having an active face for receiving solar radiation in a nuclear radiation environment, and a shunt cell having an active face for receiving nuclear radiation in said nuclear radiation environment but shielded from receiving solar radiation in said solar radiation environment;

the response of said shunt cell to nuclear radiation being at least substantially equal to that of said power cell;

first and second terminals for connecting said module to other similar modules to form a solar array;

first means electrically connecting said first terminal to the positive contact of said power cell and the negative contact of said shunt cell; and second means electrically connecting said second terminal to the negative contact of said power cell and the positive contact of said shunt cell.

2. A radiation hard solar cell module according to claim 1 wherein:

the response of said shunt cell to nuclear radiation exceeds that of said power cell.

3. A radiation hard solar cell module according to claim 1 wherein:

said cells are arranged back to back, whereby the power cell shields said shunt cell from solar radiation in said solar radiation environment and the cells are exposed to substantially the same radiation flux level in a nuclear radiation environment.

4. A radiation hard solar cell module according to claim 1 wherein:

siad solar cells and connecting means form a closed loop circuit, whereby exposure of said cells to a burst of nuclear radiation produces a transient current in one direction within said circuit; and said connecting means comprise circuit elements between said terminals and shunt cell contacts for permitting transient current flow in said one direction within said circuit and blocking d-c current flow.

5. A radiation hard solar cell module according to claim 4 wherein:

said circuit elements comprise capacitors.

6. A radiation hard solar cell module according to claim 4 wherein:

said circuit elements comprise diodes.

7. A radiation hard solar array comprising:

a plurality of solar cell modules;

each module comprising first and second terminals of adjacent modules, a pair of solar cells including a primary power generating cell having an active face for receiving solar radiation in a solar radiation environment and nuclear radiation in a nuclear radiation in a nuclear radiation environment, and a shunt cell having an active face for receiving nuclear radiation in said nuclear radiation environment, but shielded from receiving solar radiation in said solar radiation environment;

the nuclear radiation response of said shunt cell of each module being at least substantially equal to the nuclear radiation response of the corresponding power cell;

first means electrically connecting said first terminal of each module to the positive contact of its power cell and the negative contact of said shunt cell; and second means electrically connecting said second terminal to the negative contact of said power cell and the positive contact of said shunt cell.

8. A radiation hard solar array according to claim 7 wherein:

the response of said shunt cell of each module to nuclear radiation exceeds that of the power cell.

9. A radiation hard solar array according to claim 7 wherein:

said cells of each module are arranged back to back, whereby the latter cell shields the shunt cell from receiving solar radiation in said solar radiation environment and the cells are exposed to substantially the same radiation flux level in a nuclear radiation environment.

10. A radiation hard solar array according to claim 7 wherein:

said solar cells and connecting means of each module form a closed loop circuit, whereby exposure of the cells to a burst of nuclear radiation produces a transient current in one direction within said circuit; and said connecting means of each module comprise circuit elements between its terminals and shunt cell contacts for permitting transient current flow in said direction within said circuit and blocking d-c current flow.

11. The method of suppressing the output of a power generating solar cell in a nuclear radiation environment while permitting normal output of the cell in a solar environment which comprises the steps of:

shunting said power cell with a second solar cell having a response to nuclear radiation at least substantially equal to that of the power cell in such a way that the contacts of said shunt cell are reversed relative to said power cell, exposing said power cell only to the solar radiation in said solar radiation environment; and exposing both cells to the nuclear radiation in said nuclear radiation environment.

12. The method according to claim 11 wherein:

said shunt cell has greater response to said nuclear radiation than the power cell.

13. The method of suppressing the output of a solar array in a nuclear radiation environment while permitting normal output of the array in a solar radiation environment, which comprises the steps of:

shunting each power cell of the array with a second solar cell having a response to nuclear radiation at least substantially equal to that of the power cell in such a way that the contact of each shunt cell are reversed relative to its power cell, exposing said power cells only to the solar radiation in said solar radiation environment; and exposing all cells to the nuclear radiation in said nuclear radiation environment.

* * * * *